United States Patent [19]

Morimoto et al.

[11] Patent Number: 5,021,908
[45] Date of Patent: Jun. 4, 1991

[54] MAGNETIC HEAD COMPONENT MOUNTING SYSTEM

[75] Inventors: Takao Morimoto; Yasuyuki Nakanishi, both of Hyogo, Japan

[73] Assignee: Mitsubishi Denki Kabushiki Kaisha, Tokyo, Japan

[21] Appl. No.: 352,944

[22] Filed: May 17, 1989

[30] Foreign Application Priority Data

May 30, 1988 [JP] Japan .................................. 63-133053

[51] Int. Cl.⁵ ............................................. G11B 00/00
[52] U.S. Cl. ....................................... 360/107; 360/84; 360/130.22
[58] Field of Search ................... 360/107, 84.85, 97.02, 360/108, 130.22

[56] References Cited

U.S. PATENT DOCUMENTS

| 4,740,848 | 4/1988 | Schild et al. | 360/84 |
| 4,761,696 | 8/1988 | Muller et al. | 360/84 |
| 4,860,135 | 8/1989 | Cain | 360/97.02 |

FOREIGN PATENT DOCUMENTS 62-147115 9/1987 Japan .
63-52147 4/1988 Japan .

*Primary Examiner*—John H. Wolff
*Attorney, Agent, or Firm*—Burns, Doane, Swecker & Mathis

[57] ABSTRACT

A magnetic tape unit comprising a head component having a rotatable drum provided with a magnetic head, a guide plate having a tape guide mechanism for leading a magnetic tape into contact with the head component, a supporting base for supporting the head component with the rotation surface of the magnetic head inclined at predetermined angle against the guide plate, the thermal coefficient of expansion thereof being different from that of the guide plate, and mounting means for fitting the supporting base to the guide plate and for absorbing the difference in the degree of expansion and contraction therebetween appeared in a direction in parallel with the surface of the guide plate due to the difference of the thermal coefficient of expansion therebetween.

As described above, by use of the magnetic tape unit according to the present invention, the expanded portion of the supporting base is absorbed due to the fact that the thermal coefficient thereof is greater than that of the guide plate, whereby the tape inclination angle formed between the rotation surface of the magnetic head and the guide plate is not easily affected by any temperature fluctuation, so that the predetermined angle becomes invariable.

6 Claims, 4 Drawing Sheets

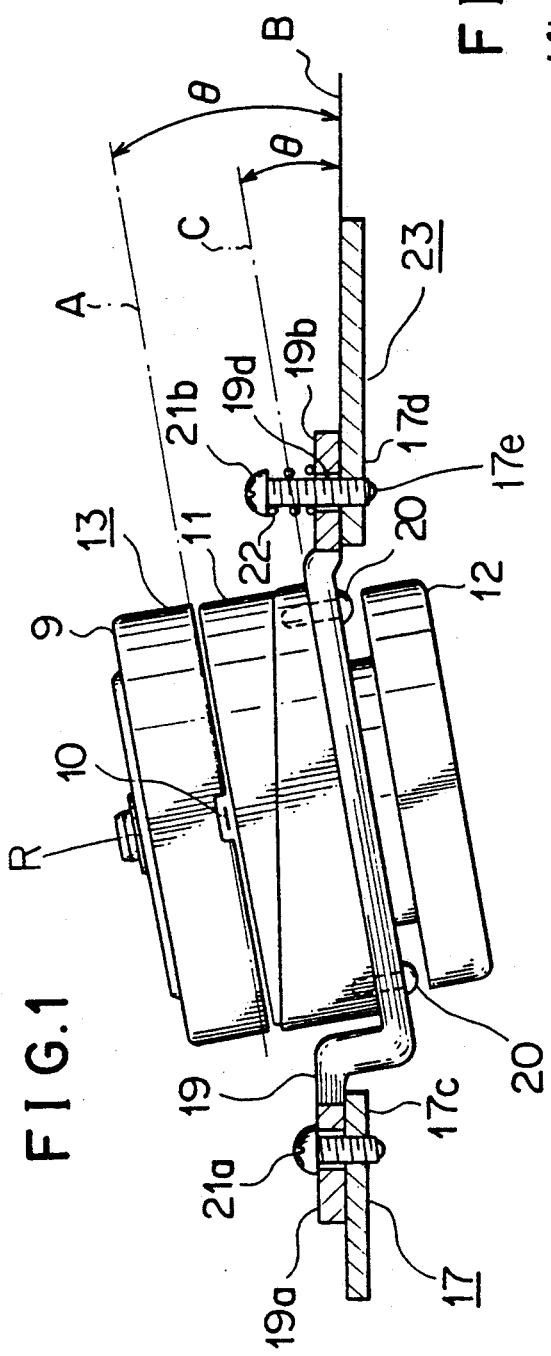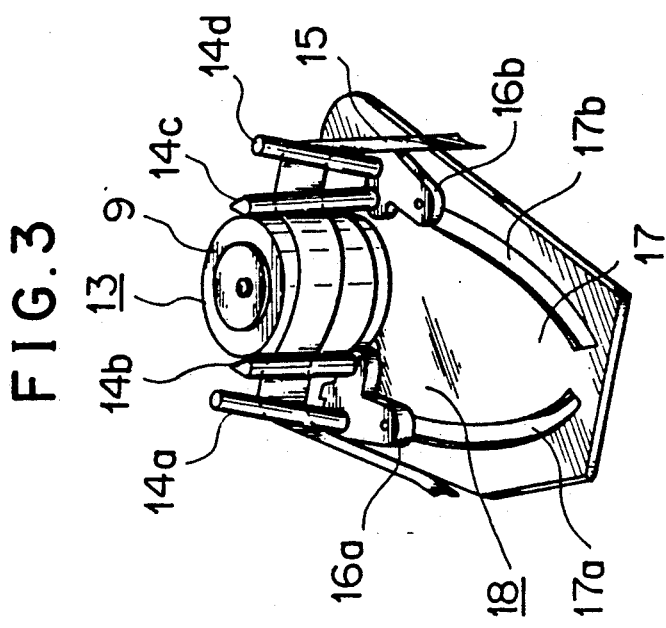

MAGNETIC HEAD COMPONENT MOUNTING SYSTEM

BACKGROUND OF THE INVENTION

The present invention relates to a magnetic tape unit such as a DAT (Digital Audio Tape Recorder), specially to the construction of the rotatable drum portion thereof.

Conventionally, there has been proposed a magnetic tape unit as disclosed in the Japanese Utility Model Laid-open Publication No. 61-61611, wherein as shown in FIG. 6, the components such as a rotatable drum 2 provided with a magnetic head (not shown) that spins around a rotational shaft 1, a fixed drum 3 for supporting the rotatable drum 2, a supporting member 4 for supporting the fixed drum 3 and a motor 5 to rotate the rotatable drum 2 altogether compose a rotative head component 6, which is fixed to a base plate 8 through a screw 7 at the outer edge portion 4a of the supporting member 4.

In the magnetic tape unit of the above construction, the supporting member 4 is generally constructed from a diecast Zinc or a resin-formed material, whereas the base plate 8 is made from a metal plate mainly adopted for economical reason. The materials of the above two objects are thus different from each other in the respective coefficients of thermal expansion and also in the degrees of expansion and contraction against the temperature fluctuation therearound, whereby at least one of these materials is deformed to produce a positional error between the base plate 8 and the rotative head component 6. On the other hand, the magnetic tape (not shown) is brought into contact with the rotatable drum 2 and the fixed drum 3 through a tape guide mechanism (not shown) provided on the base plate 8, thereby a predetermined angle (hereinafter referred to as "tape inclination angle") against the rotation surface of the magnetic head is formed so as to write/read signals to/from the surface of the magnetic tape.

Accordingly, when the subtle positional error occurs between the base plate 8 and the rotative head component 6 in accordance with the temperature fluctuation, the above tape inclination angle is not possibly maintained, and the magnetic head thereby becomes unable to read the signals stored on the magnetic tape. This phenomenon is applied specially to the vehicle-mounted type magnetic tape unit which is seriously affected to its proper operation by the abrupt temperature fluctuation generated inside the vehicle.

The primary object of the present invention therefore is to eliminate the above problems contained by the conventional unit, in other words, to provide a magnetic tape unit, wherein the predetermined tape inclination angle is not affected by any temperature fluctuation therearound.

SUMMARY OF THE INVENTION

The magnetic tape unit according to the present invention comprises a guide plate having a tape guide mechanism for supporting a head component in such a manner that the rotation surface of the magnetic head is inclined at the predetermined angle against the surface of the guide plate, a supporting plate having a different coefficient of thermal expansion from that of the guide plate, and a buffer means for absorbing the difference of the degrees of expansion and contraction in the direction of the guide plate surface caused by the mentioned difference of the coefficients of the thermal expansion between the above plates.

By utilization of the magnetic tape unit of the above structure, the buffer means absorbs the difference of the level of expansion and contraction between the guide plate and the supporting base in the direction of the guide plate surface generated by the difference of the respective thermal coefficient of expansion between the above two plates, so that the inclination angle provided therebetween is always maintained at the predetemined level against the temperature fluctuation caused therearound.

BRIEF DESCRIPTION OF THE DRAWINGS

FIGS. 1 to 3 show a first preferred embodiment of the magnetic tape unit according to the present invention;

FIG. 1 is a sectional side view taken along the line I—I as shown in FIG. 2;

FIG. 2 is a top plan view;

FIG. 3 is a perspective view;

FIG. 4 is a sectional side view taken along the line IV—IV shown in FIG. 5;

FIG. 5 is a top plan view; and,

In these figures above, the objects indicated by the same numerals show the same thing or the corresponding portion thereto.

DETAILED DESCRIPTION OF THE EMBODIMENT

Figure 2:
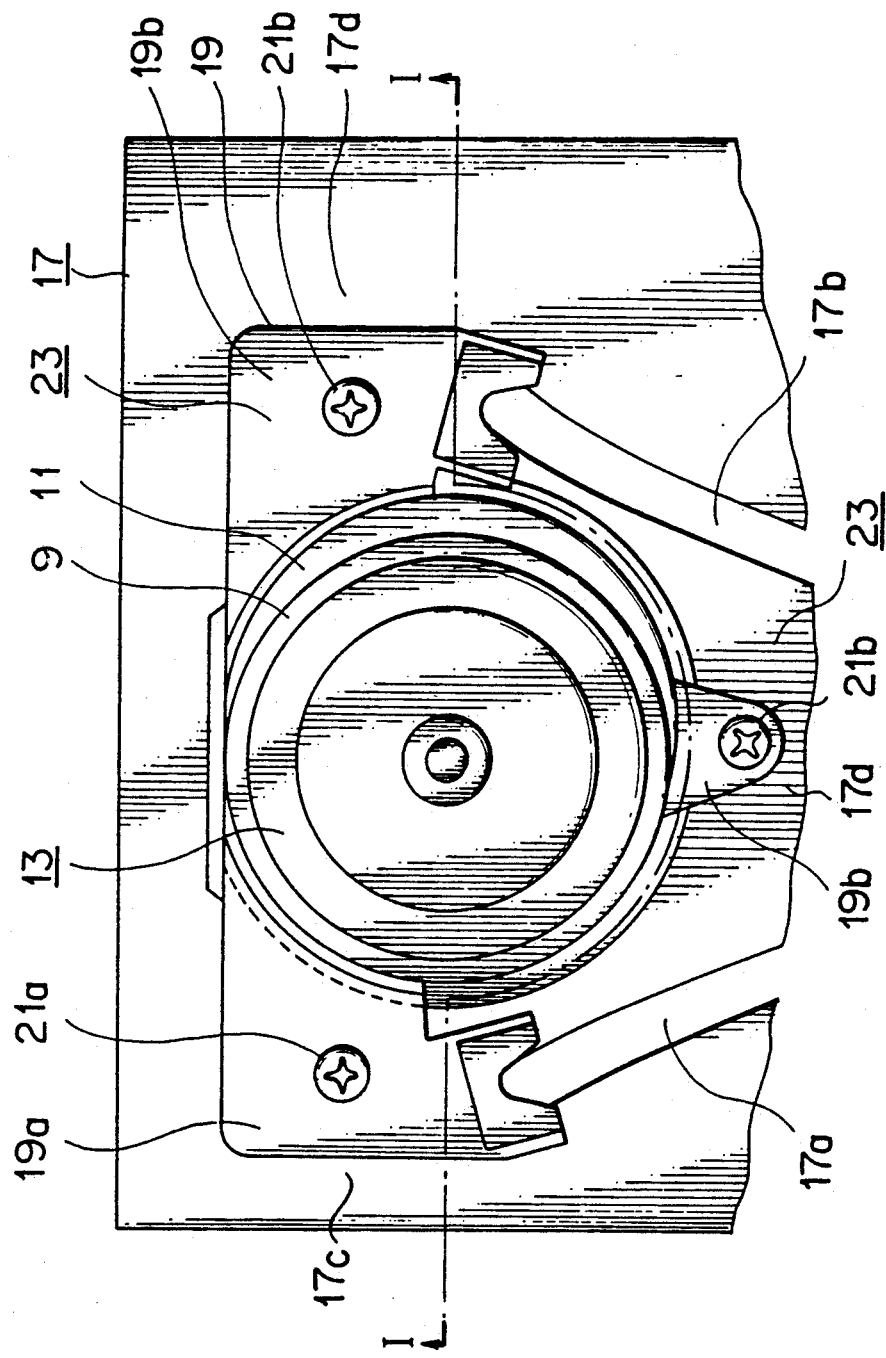

Below shows a detailed description of an embodiment of the present invention.

In FIGS. 1 to 3, 9 denotes a rotatable drum provided with a magnetic head 10, 11 a fixed drum provided for supporting the rotatable drum 9, 12 a motor to activate the rotatable drum 9, wherein the above rotatable drum 9 and the fixed drum 11 together compose a head component 13. 14a to 14d are guide shafts for leading the magnetic tape 15 into contact with the head component 13, 16a and 16b are respectively guide-shaft supporting members, and 17 is a guide plate made of a material wherein the guide grooves 17a and 17b are provided.

As mentioned above, the guide shafts 14a to 14d, the guide-shaft supporting members 16a and 16b, and the guide grooves 17a and 17b get together composing a tape guide mechanism 18. The guide plate 17 having the above tape guide mechanism 18 regulates the running position of the magnetic tape 15 in such a manner that the magnetic tape 15 can form a predetermined tape inclination angle in accordance with the rotation surface A of the magnetic head 10. 19 is a supporting base made of diecast Zinc or a resin-formed material provided for fixedly supporting the head component 13 through a fixing screw 20, whose coefficient of thermal expansion is different from that of the guide plate 17, and the fitting portions 19a and 19b thereof are fixedly connected to the fitting portions 17c and 17d of the guide plate 17.

Further, the central portion of supporting base 19 is as shown in FIG. 1, inclined downwardly to the left, thereby the angle formed by the rotation surface A of the magnetic head 10 and the surface B of the guide plate 17 is settled at the predetermined mounting angle. In this case, the predetermined mounting angle is exactly synchronized with the magnetic tape inclination angle. Furthermore, the rotational surface A and the surface C of the supporting base 19 are in parallel, whereby the angle formed by the surface C of the supporting base 19 and the surface B of the guide plate 17 is settled to be also at the mounting angle.

Concerning the related fitting portions 17c and 19a, 21a is a fixing screw to fix the supporting base 19 to the guide plate 17. Concerning the related portions 17d and 19b, as seen in FIG. 1, 21b is a fixing screw that is fixed to the guide plate 17 through a fitting hole 17e, and that extends through the fitting hole 19d, in the supporting base 19. Also, a predetermined space is formed in the supporting base 19 side, wherein 22 is a coil spring loosely inserted on the fixing screw 21a and compressedly provided between the supporting base 19 and the head portion of the fixing screw 21b. In this structure above, the screw 21b and the fitting portions 17d and 19b forming a mounting means 23 together, whereby the predetermined space provided in the fitting hole 19d is formed in such a manner that the difference in the degrees of expansion and contraction between the guide plate 17 and the supporting base 19 caused by the temperature fluctuation is substantially absorbed since as seen from FIG. 1 the supporting base 19 is slidingly held to the guide plate 17 by the screw 21b and the coil spring 22.

In the embodiment of the above construction, the guide shafts 14a to 14d draw out the magnetic tape 15 from a cassette case (not shown), then each of the guide-shaft supporting members 16a and 16b are shifted along the guide grooves 17a and 17b thereby to lead the magnetic tape 15 into contact with respectively the rotatable drum 9 and the fixed drum 11. By this operation, the magnetic tape 15 and the rotation surface A of the magnetic head 10 maintain a predetermined tape inclination angle so as to correctly perform write or read operation of the signals stored on the tape.

In the above construction, even when the ambient temperature thereof arises, the fitting portions 17c and 19a are not affected since they are firmly fixed to each other, whereas concerning the mounting portions 17d and 19b, since the coefficient expansion rate of the supporting base 19 is greater than that of the guide plate 17, the expanded portion of the supporting base 19 is shifted towards right, as shown in FIG. 1, starting from the both fitting portions 17c and 19a in parallel with the surface B of the guide plate 17. Accordingly, the mounting angle formed between the rotation surface A of the magnetic head 10 and the surface B of the guide plate 17 can be maintained at one level in spite of the rise of temperature. By this, it is obvious that the above angle is maintained at one level also when the temperature lowers. Accordingly, the tape inclination angle can be maintained against any temperature fluctuation, so that precise writing or reading operation of the signals stored on the tape can be performed. Similarly, an angle between the guide plate 17 and a rotational axis R of the rotatable drum 9 will also necessarily remain constant during temperature fluctuations which result in thermal expansion or contraction of the supporting base 19 and the guide plate 17.

Figure 4:
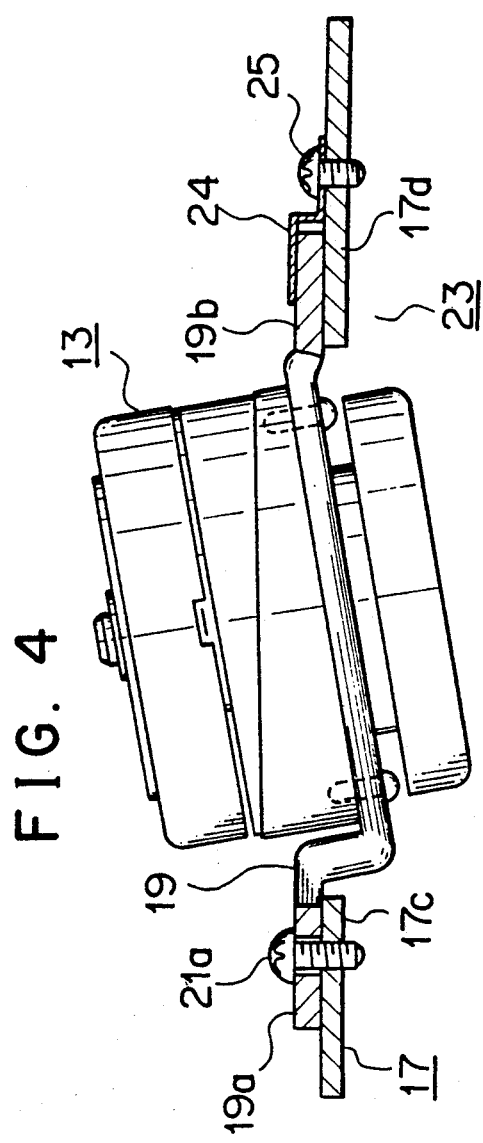
FIGS. 4 and 5 show a second embodiment of the magnetic tape unit according to the present invention.
Figure 6:
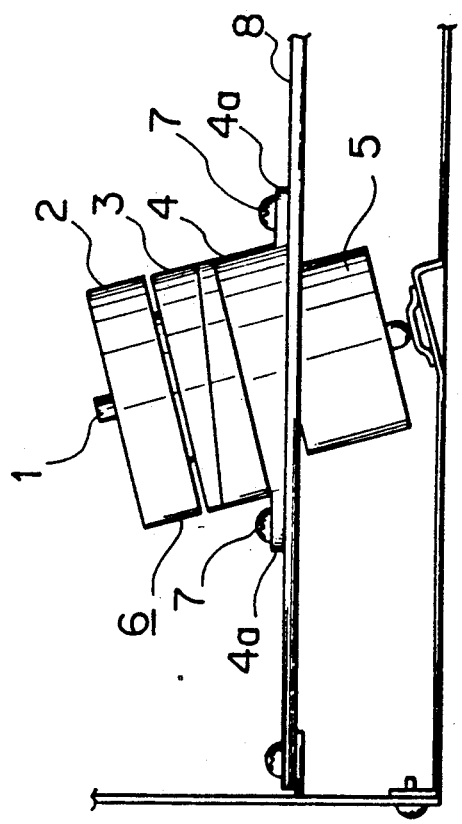
FIG. 6 is a front view of the magnetic tape unit of a conventional type.
Figure 5:
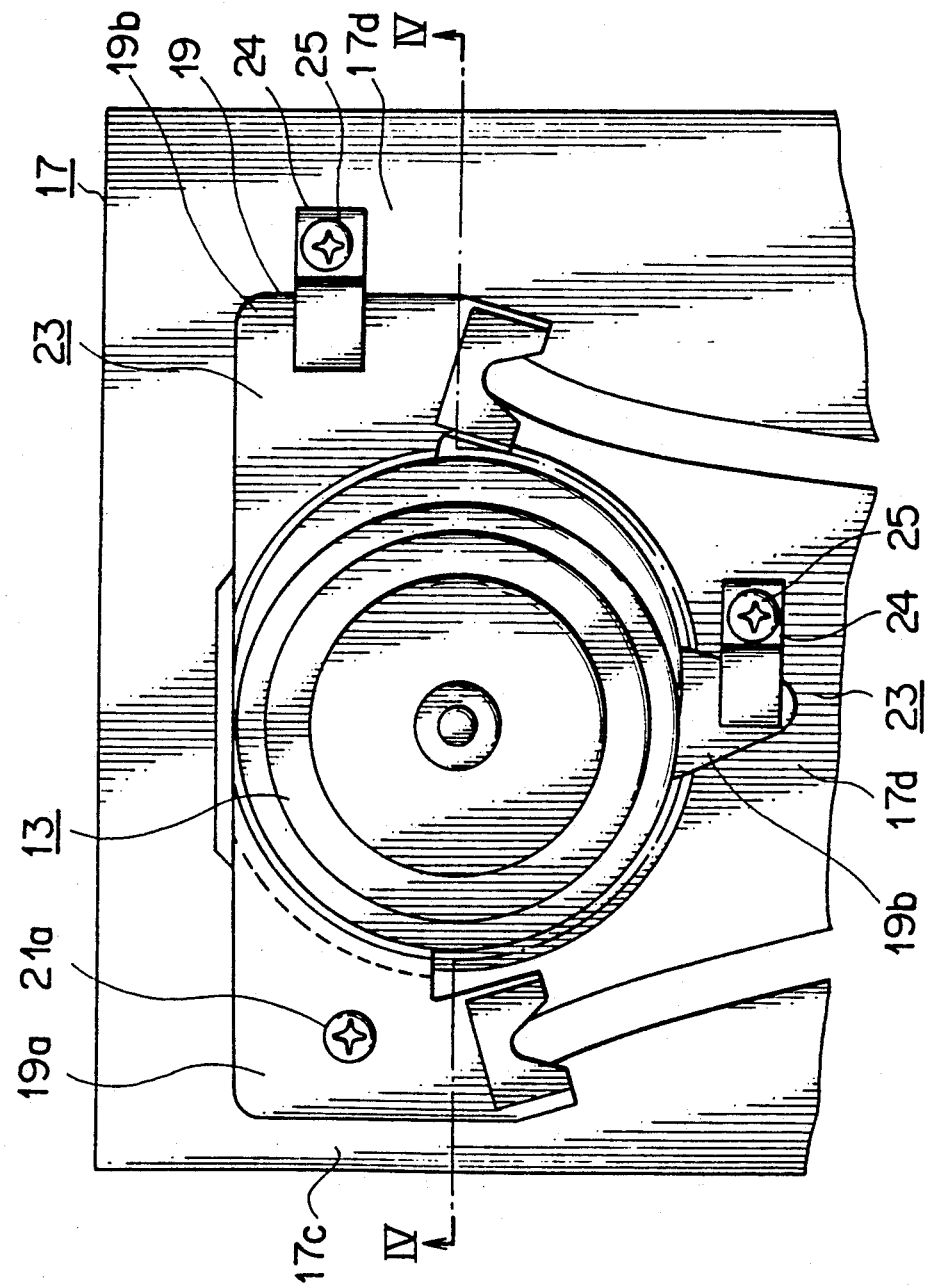

Furthermore, in the above embodiment, since the fitting portion 19b of the supporting base 19 is suppressively attached to the fitting portion 17d of the guide plate 17 by function of the coil spring 22, the supporting base 19 is not easily affected by vibration or shock, thereby the tape inclination angle is maintained, and in the case that rather strong shock to vibrate the supporting base 19 is caused, the inner constituents of the head component 13 can be protected as the coil spring 22 absorbs it. FIGS. 4 and 5 show another embodiment of the present invention, wherein the resilient plate 24 to suppressively and slidingly attach the fitting portion 19b of the supporting base 19 to the fitting portion 17d of the guide plate 17 is fastened to the guide plate 17 through a fixing screw 25, providing the same effect as the first embodiment.

In the both embodiments above, the fitting portions 17c and 19a are fixed to each other, these portions can also be constructed as the other portions 17d and 19b.

Furthermore, as well as to the DAT, these embodiments can also be applied to other types of magnetic tape unit such as VTRs wherein a head component is adopted.

What is claimed is;

1. A magnetic head component mounting system, comprising:
    a magnetic head component including a rotatable drum carrying a magnetic head;
    a guide plate carrying a tape guiding mechanism for guiding a magnetic tape in proximity to said magnetic head component;
    a supporting base supporting said magnetic head component such that a rotational axis of said rotatable drum is oriented at an angle relative to said guide plate, said supporting base and said guide plate having different coefficients of thermal expansion; and
    mounting means for mounting said supporting base to said guide plate such that said angle remains constant during thermal expansion or contraction of said supporting base and said guide plate.

2. A magnetic head component mounting system as claimed in claim 1, wherein said mounting means includes at least one resilient plate slidably holding said supporting base to said guide plate.

3. A magnetic head component mounting system as claimed in claim 2, wherein said mounting means further includes at least one screw fastening said supporting base to said guide plate.

4. A magnetic head component mounting system as claimed in claim 1, wherein said mounting means includes a first screw which is fixed in a first hole in one of said supporting base and said guide plate, and which extends through a second hole in an other of said supporting base and guide plate, and
    a coil spring extending under compression between a head of said screw and said other of said supporting base and said guide plate, such that said supporting base is slidably held to said guide plate.

5. A magnetic head component mounting system, comprising:
    a magnetic head component including a rotatable drum carrying a magnetic head;
    a guide plate carrying a tape guiding mechanism for guiding a magnetic tape in proximity to said magnetic head component;
    a supporting base supporting said magnetic head component such that a rotational axis of said rotatable drum is oriented at an angle relative to said guide plate, said supporting base and said guide plate having different coefficients of thermal expansion; and
    mounting means for mounting said supporting base to said guide plate such that said angle remains constant during thermal expansion or contraction of said supporting base and said guide plate, wherein said mounting means includes
a first screw which is fixed in a first hole in one of said supporting base and said guide plate, and which extends through a second hole in an other of said supporting base and guide plate, and
a coil spring extending under compression between a head of said screw and said other of said supporting base and said guide plate, such that said supporting base is slidably held to said guide plate.

6. A magnetic head component mounting system as claimed in claim 5, wherein said mounting means further includes a second screw fastening said supporting base to said guide plate.

* * * * *